(12) United States Patent
Roth et al.

(10) Patent No.: US 7,302,747 B1
(45) Date of Patent: Dec. 4, 2007

(54) APPARATUS AND METHOD TO MANUFACTURE A LEAF DISPLAY DEVICE

(76) Inventors: Mathew R. Roth, 185 W. Hwy. 40, Barberville, FL (US) 32105; Vann H. Underhill, 185 W. Hwy. 40, Barberville, FL (US) 32105

( * ) Notice: Subject to any disclaimer, the term of this patent is extended or adjusted under 35 U.S.C. 154(b) by 180 days.

(21) Appl. No.: 10/673,827

(22) Filed: Sep. 29, 2003

(51) Int. Cl.
*B23Q 3/00* (2006.01)

(52) U.S. Cl. ............................. 29/464; 29/445; 29/450

(58) Field of Classification Search ................. 29/464, 29/445, 450; 428/15, 17–23, 27
See application file for complete search history.

(56) References Cited

U.S. PATENT DOCUMENTS

| | | | |
|---|---|---|---|
| 4,011,677 A | * | 3/1977 | Higdon et al. ................. 47/55 |
| 4,802,271 A | | 2/1989 | Bader |
| 5,207,758 A | | 5/1993 | Royalty |
| 5,247,729 A | | 9/1993 | Carmichael |
| 5,255,421 A | | 10/1993 | Kamysiak |
| 5,506,009 A | | 4/1996 | Stolzman et al. |
| 5,513,978 A | | 5/1996 | Eimerman, Jr. et al. |
| 5,759,645 A | * | 6/1998 | Li ............................... 428/20 |
| 5,829,490 A | | 11/1998 | Kilbane |
| 5,896,638 A | | 4/1999 | Kamysiak |
| 5,955,018 A | | 9/1999 | Prime |
| 6,068,894 A | * | 5/2000 | Morford et al. .............. 428/22 |
| 6,073,921 A | | 6/2000 | Gramelspacher |

* cited by examiner

*Primary Examiner*—David P. Bryant
*Assistant Examiner*—Christopher M Koehler
(74) *Attorney, Agent, or Firm*—Paul S. Rooy P.A.

(57) ABSTRACT

A method and apparatus to manufacture a leaf display device. The method includes the steps of positioning a top leaf on a broadleaf stem substantially co-linear with the broadleaf stem; positioning a leaf adjacent the top leaf substantially parallel to, and on top of the top leaf; positioning a leaf adjacent the leaves already stacked substantially parallel to, and on top of the previously stacked leaves; and repeating the previous step until all leaves desired to be stacked have been stacked. The method may include the additional steps of employing a notched broadleaf stem holder to hold stacked broadleaf stems in the correct configuration until they are ready to be used for assembly. The notched broadleaf stem holder may be supported on a table or a transportation device by means of a broadleaf stem holder support. An alternate embodiment broadleaf stem holder comprises a recess sized to admit and hold at least one stacked broadleaf stem. The alternate embodiment broadleaf stem holder may comprise one or more partitions defining individual recesses sized to admit and hold at least one stacked broadleaf stem.

4 Claims, 8 Drawing Sheets

18

20

18

22

24

Sect. XII - XII

APPARATUS AND METHOD TO MANUFACTURE A LEAF DISPLAY DEVICE

BACKGROUND OF THE INVENTION

1. Field of the Invention

This invention relates to leaf display devices, and in particular to an apparatus and method to manufacture broadleaf display devices such as wreaths and garlands.

2. Background of the Invention

Leaf display devices have been known for many years. As early as the Greek and Roman republics garlands made of olive or oak leaves were worn by military heroes. Larger wreaths were used during holidays and festivals, notably Christmas.

In Sweden, the Christmas season starts on December 13th, which is St. Lucia Day. The oldest daughter in the house dresses in white and wears a green wreath with seven candles on her head. In many countries wreaths and garlands of holly and branches of evergreen are used to decorate homes during the Christmas season. In Germany, wreaths are popular decorations used in the household during Advent season.

Although wreaths have traditionally been made of evergreen or holly, more recently broadleaf plants such as magnolia leaves have been used for this purpose. Advantages inherent in the use of broad leaves include less needle droppage as the branches dry out, enhanced aesthetics, and durability. Properly dried broadleaf wreaths or garlands can last virtually indefinitely.

FIGS. 1-3 illustrate currently employed methods of manufacturing leaf display devices such as wreaths and garlands. Broadleaf stems 2 of appropriate length are cut, as depicted in FIG. 1. A number of broadleaf stems 2 are placed within a clamp 104 on ring frame 106 or garland frame 108, and then clamp 104 is bent closed to firmly grasp the broadleaf stems 2 within it. This operation is repeated until each clamp 104 desired holds broadleaf stems. The shape of the final product is determined by the shape of the frame: the ring frame 106 depicted in FIG. 2 will yield an annular shaped wreath, while the garland frame 108 depicted in FIG. 3 will produce a long, straight garland decoration.

There are a number of problems inherent in current leaf display device manufacturing. First, the placement of leaves on broadleaf stems occurs due to the dictates of nature, sunshine exposure, and the leaves' primary function of manufacturing food for the plant, not to make wreaths prettier. Thus, when the broadleaf stems are clamped into a form, the leaf placement can look haphazard and messy. Therefore, it would be desirable to provide a method and apparatus for arranging leaves prior to clamping, so the finished product looks more ordered and less messy.

A major advantage inherent in the use of broad leaves such as magnolia leaves for wreaths and garlands is the two-tone coloration of these leaves. The upper surface is typically green, while the lower surface exhibits a different color, typically a beautiful copper color in the case of magnolia leaves. Thus, it would be desirable to provide a method and apparatus for controlling the number and placement of leaves which end up in the finished product with their upper surface showing vs. those that end up with their lower surface showing.

Third, even though broadleaf wreaths and garlands last longer than traditional evergreen pieces, if not dried correctly, broadleaf wreaths and garlands will discolor and brown over time, and not retain their vibrant colors. Thus, it would be desirable to develop a method of effectively drying broadleaf wreaths and garlands.

Finally, conventional broadleaf wreath and garland making involves the steps outlined above pertaining to FIGS. 1-3: cutting stems and securing them to frames by means of clamps 104. This is a one-by-one process, and concentrates all the skill required of the personnel in one step. Hence, it would be desirable to provide a method and apparatus for manufacturing wreaths and garlands wherein broadleaf stems may be arranged as desired, stored, moved to a final assembly area, and then assembled into the leaf display device as desired.

SUMMARY OF THE INVENTION

Accordingly, it is an object of the present invention to provide an apparatus and method to manufacture a leaf display device which provide a method of arranging broad leaves prior to clamping, so the finished product looks more ordered and less messy. Design features allowing this object to be accomplished may include one or more of the method steps of: positioning a leaf adjacent the top leaf substantially parallel to, and on top of the top leaf; positioning a leaf adjacent the leaves already stacked substantially parallel to, and on top of the previously stacked leaves; and repeating the previous step until all leaves desired to be stacked have been stacked, and may include the apparatus feature of a broadleaf stem holder capable of holding a stacked stem in the correct configuration until assembly. Advantages associated with the accomplishment of this object include a more attractive and aesthetically pleasing finished product.

It is another object of the present invention to provide an apparatus and method to manufacture a leaf display device which controls the number and placement of leaves which end up in the finished product with their upper surface showing vs. those that end up with their lower surface showing. A method step allowing this object to be accomplished includes selecting which side of a given leaf should appear uppermost, and rotating that leaf so that the selected side appears uppermost. Benefits associated with the accomplishment of this object include a more attractive and aesthetically pleasing finished product.

It is still another object of this invention to provide an apparatus and method to manufacture a leaf display device which effectively dries broadleaf wreaths and garlands. Method steps enabling the accomplishment of this object include placing a leaf display device inverted in a drying area, drying for three days at a temperature substantially equal to 85-90 degrees F.±5 degrees and a relative humidity equal to 30%±10%, and then turning the leaf display device right side up for an additional day of drying under the same conditions. Advantages associated with the realization of this object include increased leaf display device durability, and a more aesthetically pleasing and natural appearance.

It is another object of the present invention to provide an apparatus and method to manufacture a leaf display device wherein broadleaf stems may be arranged as desired, stored, moved to a final assembly area, and then assembled into a leaf display device as desired. Design features allowing this object to be accomplished include a transportation device capable of accommodating one or more broadleaf stem holders. Benefits associated with the accomplishment of this object include increased manufacturing efficiency, and hence reduced cost.

BRIEF DESCRIPTION OF THE DRAWINGS

The invention, together with the other objects, features, aspects and advantages thereof will be more clearly understood from the following in conjunction with the accompanying drawings.

Eight sheets of drawings are provided. Sheet one contains FIGS. 1, 2 and 3. Sheet two contains FIGS. 4 and 5. Sheet three contains FIGS. 6 and 7. Sheet four contains FIGS. 8 and 9. Sheet five contains FIGS. 10 and 11. Sheet six contains FIGS. 12 and 13. Sheet seven contains FIGS. 14 and 15. Sheet eight contains FIGS. 16 and 17.

DETAILED DESCRIPTION OF THE PREFERRED EMBODIMENT

Figure 4:
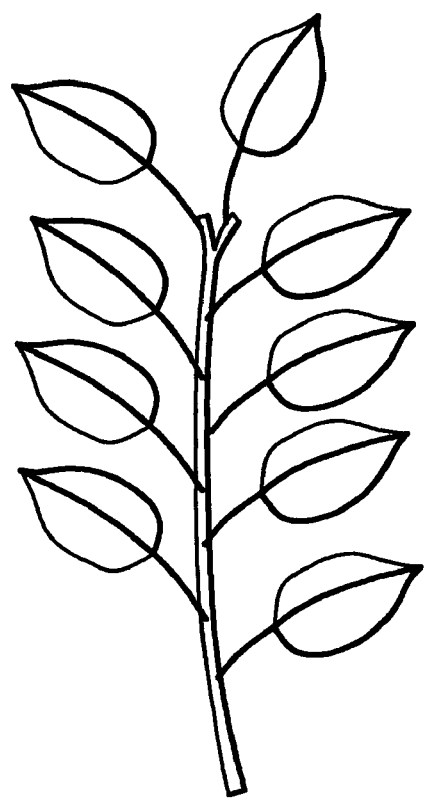
FIG. 4 is a front isometric view of broadleaf stem.

FIGS. 4-11 depict the instant method of stacking broadleaf stems preparatory to assembling them into leaf display devices such as wreaths, garlands, or other finished products. FIG. 4 is a front isometric view of broadleaf stem 2 ready for stacking.

Figure 5:
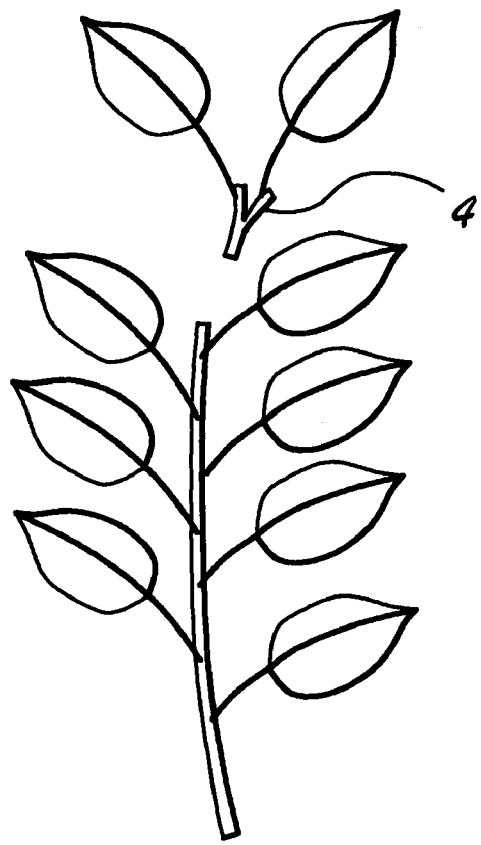
FIG. 5 is a front isometric view of a broadleaf stem with its top trimmed off.

FIG. 5 is a front isometric view of broadleaf stem 2 with its top portion 4 being trimmed off as necessary to leave one leaf emerging from a single stem 7. As will become clear during the discussion of FIGS. 6-9 below, broadleaf stem 2 comprises top portion 4, first leaf 6 disposed at the top after broadleaf stem top portion 4 has been removed, second leaf 8 disposed immediately below first leaf 6, third leaf 10 disposed immediately below second leaf 8, fourth leaf 12 disposed immediately below third leaf 10, fifth leaf 14 disposed immediately below fourth leaf 12, and may comprise bottom leaves 16 which will ultimately be discarded as superfluous.

Figure 6:
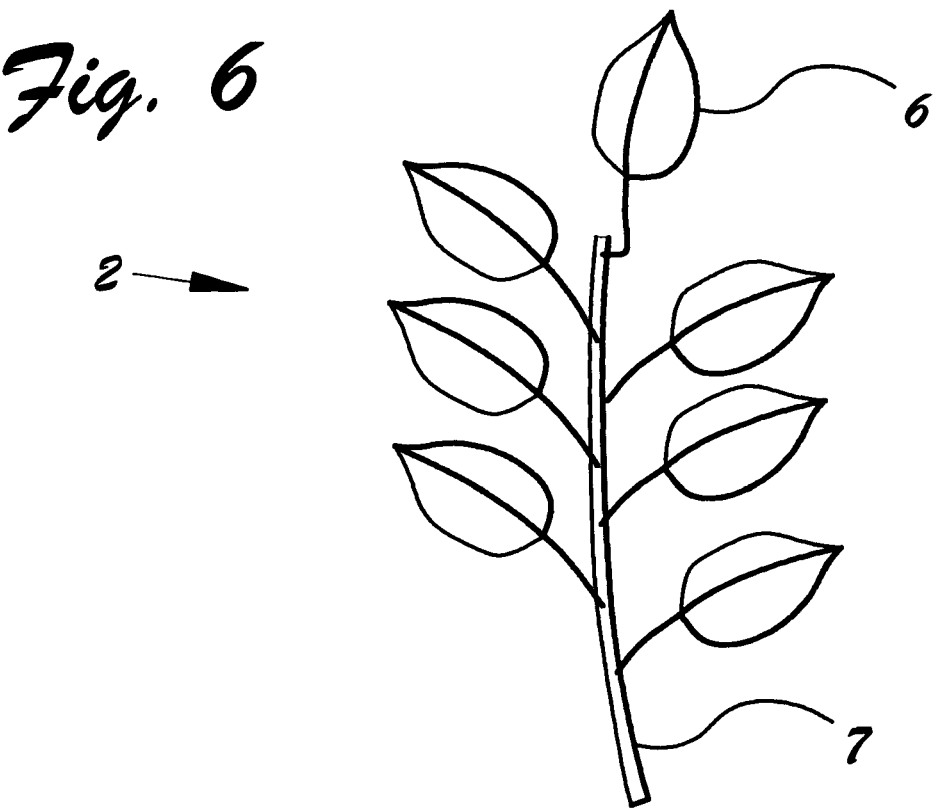
FIG. 6 is a front isometric view of a broadleaf stem with its first leaf stacked.
Figure 7:
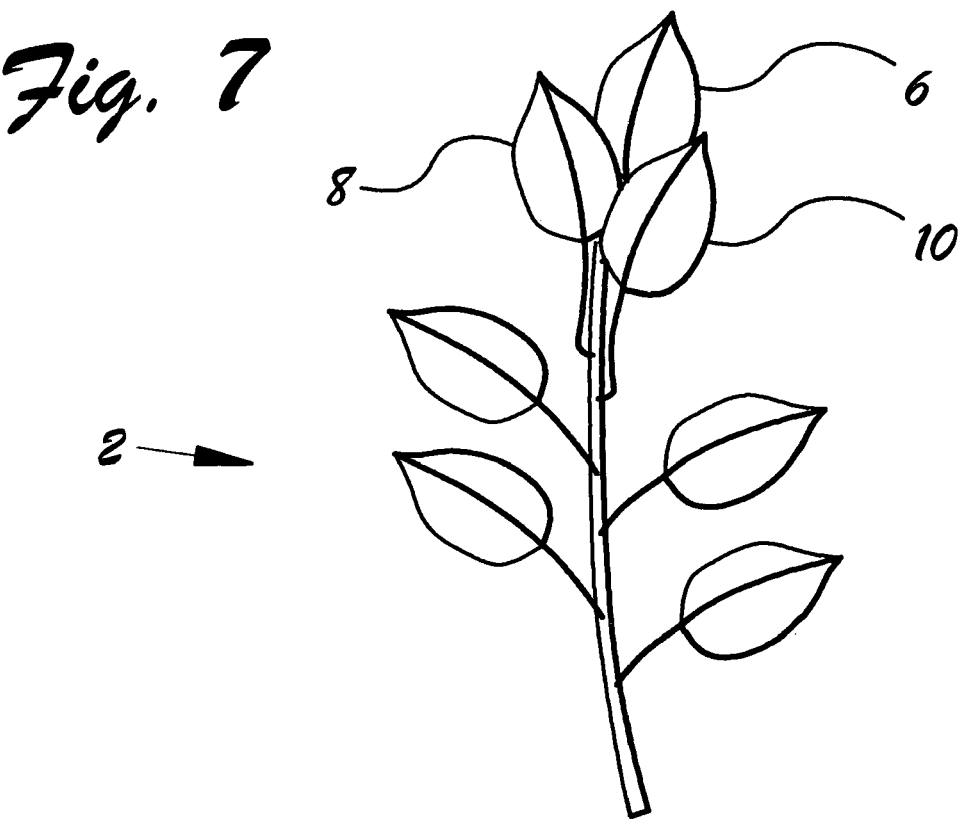
FIG. 7 is a front isometric view of a broadleaf stem with its first three leaves stacked.
Figure 8:
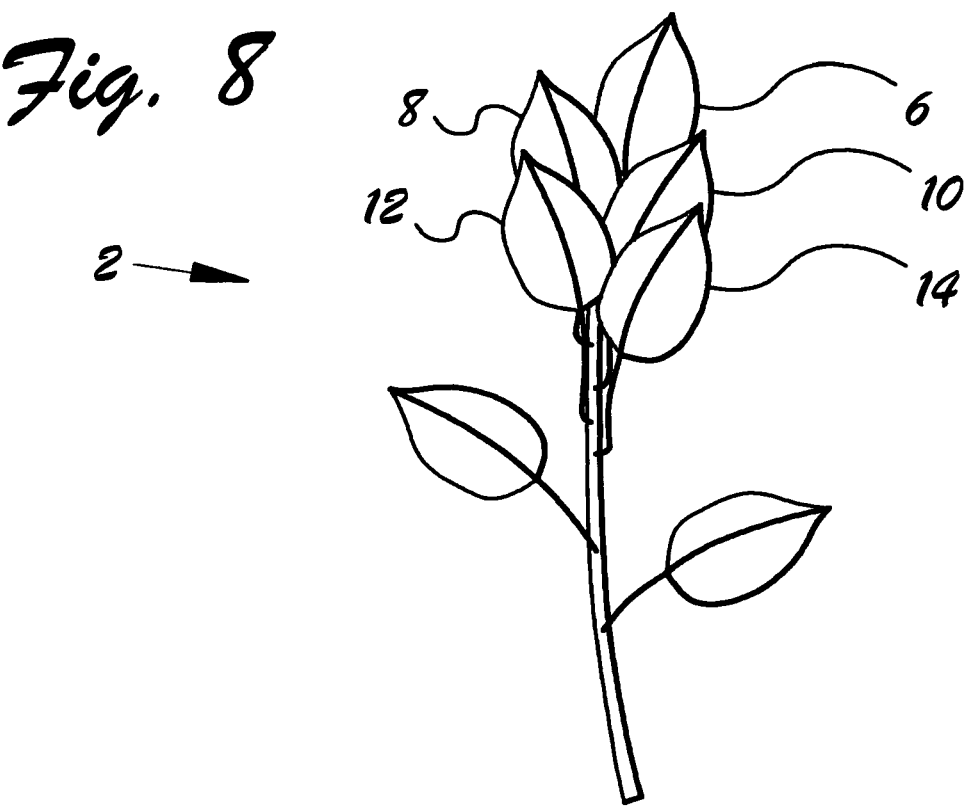
FIG. 8 is a front isometric view of a broadleaf stem with its first five leaves stacked.

First leaf 6 is oriented to be substantially co-linear with stem 7, as indicated in FIG. 6. Second leaf 8 is then positioned substantially parallel to, and on top of first leaf 6, and then third leaf 10 is positioned substantially parallel to, and on top of second leaf 8, as depicted in FIG. 7. Fourth leaf 12 is then placed over third leaf 10, and fifth leaf 14 is placed over fourth leaf 12, as depicted in FIG. 8. This stacking process is continued until all leaves which are desired to comprise stacked broadleaf stem 18 have been oriented parallel to each other, and stacked sequentially over one another in their order from the top of broadleaf stem 2.

Figure 9:
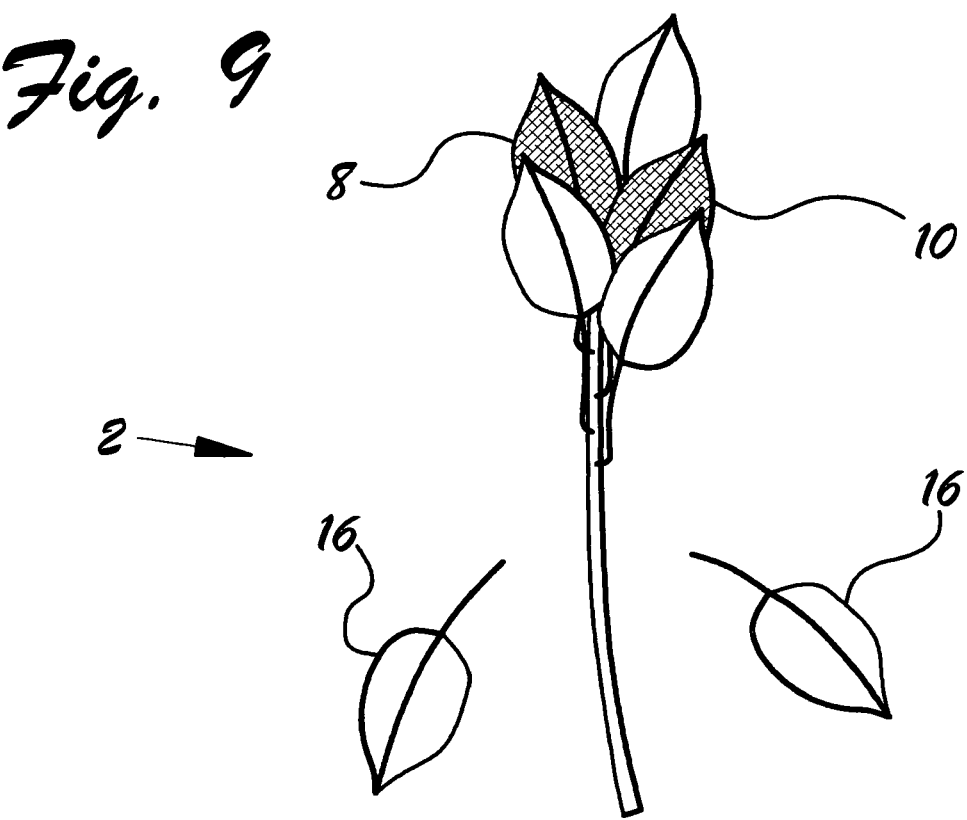
FIG. 9 is a front isometric view of a broadleaf stem with its leaves stacked, and its last two leaves trimmed off.
Figure 10:
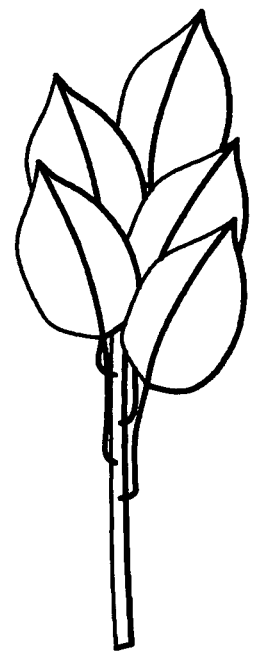
FIG. 10 is a front isometric view of a broadleaf stem with its leaves stacked, and its lower stem being trimmed off.
Figure 10:
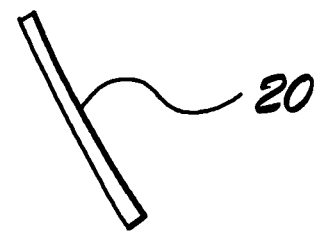
Figure 12:
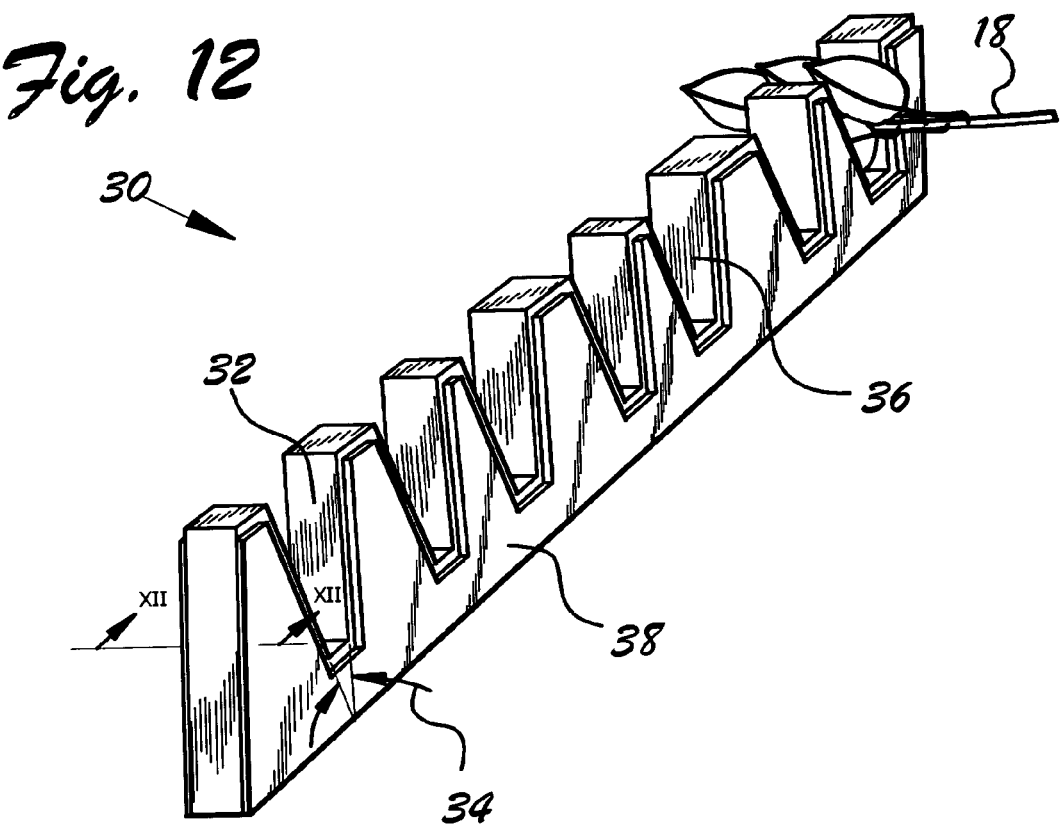
FIG. 12 is a front isometric view of a broadleaf stem holder.
Figure 16:
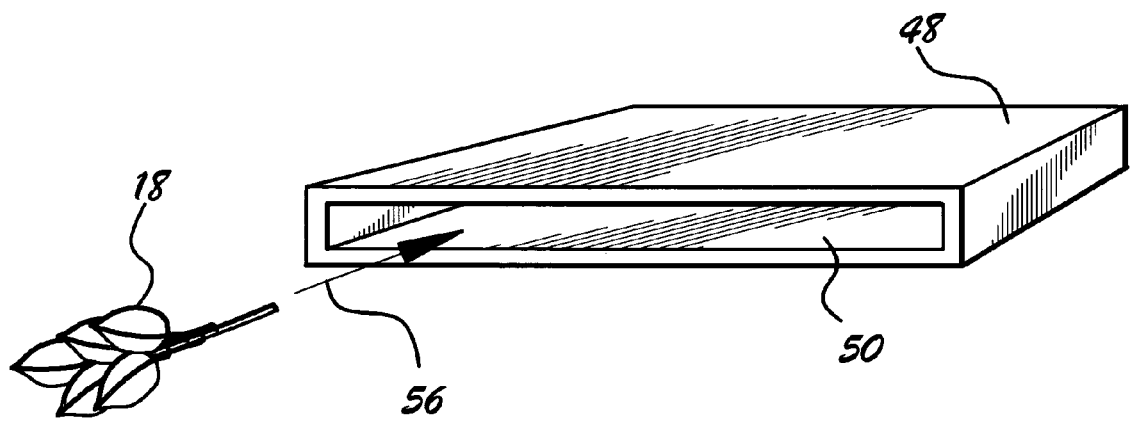
FIG. 16 is a front isometric view of an alternate embodiment broadleaf stem holder.

Finally, any remaining bottom leaves 16 are removed, and stem bottom 20 is trimmed off so as to leave stacked broadleaf stem 18 in the correct length, as illustrated in FIGS. 9 and 10. Stem bottom 20 may be trimmed off after the stacked broadleaf stems 18 have been inserted into a broadleaf stems holder 30 or 48 as illustrated in FIGS. 12 and 16 in order to facilitate producing stacked broadleaf stems, 18 of a uniform length.

Figure 11:
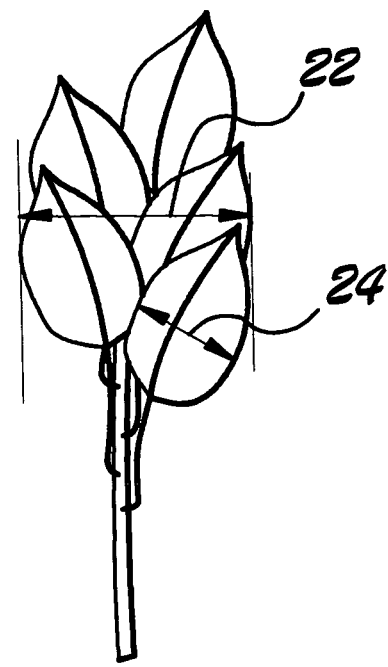
FIG. 11 is a front isometric view of a trimmed broadleaf stem with its leaves stacked, ready for assembly.

FIG. 11 depicts the finished stacked broadleaf stem 18. When correctly stacked, stacked broadleaf stem width 22 is approximately twice the average individual leaf width 24.

FIGS. 4-11 only depict five leaves being stacked. In practice, however, any number of leaves may be stacked, depending on the size finished stacked broadleaf stem 18 desired. A lesser number of leaves being stacked is depicted in FIGS. 4-11 in interest of clarity and the avoidance of unnecessary repetition.

A major advantage inherent in the use of broad leaves such as magnolia leaves for leaf display devices is the two-tone coloration of these leaves. Their upper surface is typically green, while the lower surface exhibits a different color, frequently a beautiful copper color in the case of magnolia leaves. Thus, the instant method may be used to stack one or more, up to and including all the leaves, with their lower surfaces showing.

FIG. 9 depicts a stacked broadleaf stem 18 wherein second leaf 8 and third leaf 10 have been stacked so that their copper colored lower surfaces are visible; all other leaves have been stacked so their green upper surfaces are visible. A leaf may be stacked so that its lower surface shows simply by rotating the leaf 180 degrees about its individual stem until its lower surface shows prior to stacking it. Second leaf 8 and third leaf 10 in FIG. 9 have been cross-hatched orange to indicate that their lower surfaces are showing.

The appearance of the finished product may be tightly controlled by specifying which leaf or leaves should have their lower surfaces showing. For example, a wreath could be specified to be made of stacked broadleaf stems 18 whose second leaf 8 only has been turned to show its lower surface, and all other leaves show their upper surfaces. Another example could be a wreath specified to be made of stacked broadleaf stems 18 whose second leaf 8 and third leaf 10 only have been turned to show their lower surfaces, and all other leaves show their upper surfaces. As yet another example, a wreath could be specified to be made of stacked broadleaf stems 18 all of whose leaves have been turned to show their lower surfaces.

The ability to tightly control the appearance of a wreath by specifying which leaves will be turned to show their lower surface(s) represents a significant advance in the science of leaf display device manufacturing. Another factor which may influence whether the lower surface of a leaf is to be turned up is the condition of the lower surface of the leaf: some leaves may have imperfections such as unsightly spots on their lower surfaces which would show if the underside were to be turned up. Such leaves may be best left with their upper surfaces showing, so as to hide the imperfections on their lower surfaces.

Figure 1:
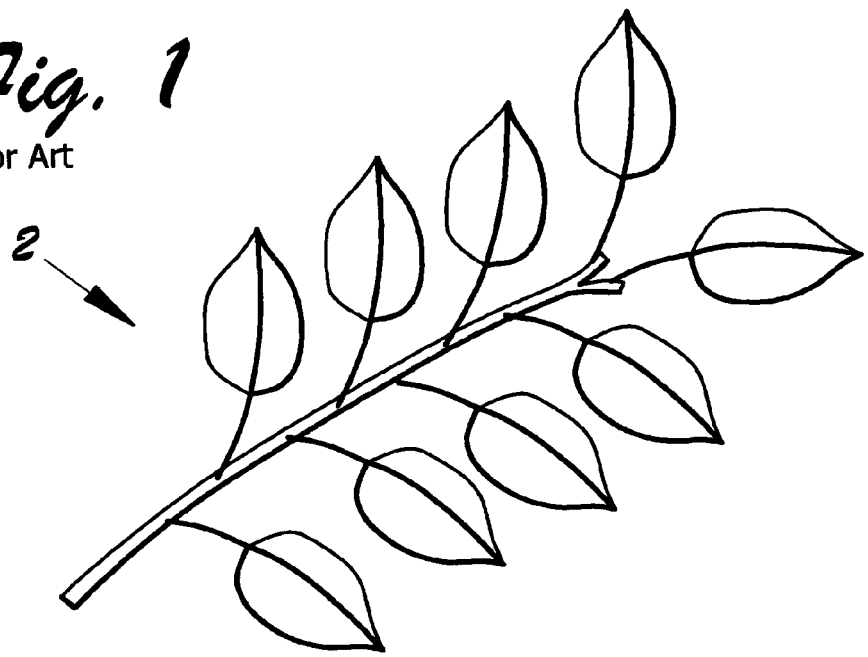
FIG. 1 is a front isometric view of a broadleaf stem.
Figure 2:
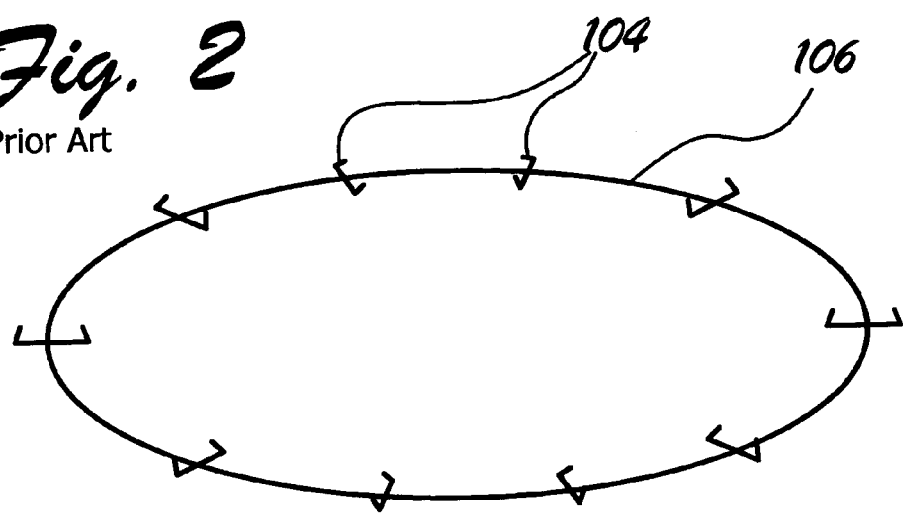
FIG. 2 is a top isometric view of a prior art ring frame.
Figure 3:
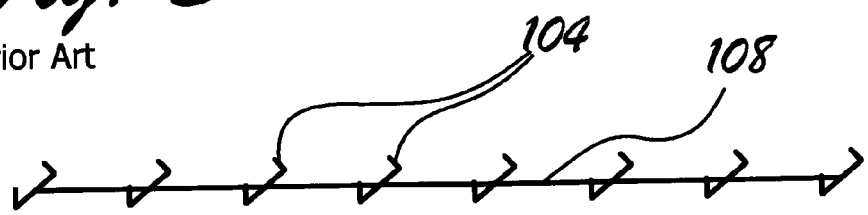
FIG. 3 is a top isometric view of a prior art garland frame.

Once stacked broadleaf stem 18 has been produced, it may be inserted into a clamp 104 as depicted in FIGS. 2 and 3 and the final assembly produced on the spot, and such method step, in combination with one or more of the previously described method steps, is intended to fall within the scope of this disclosure. In the alternative, stacked broadleaf stems 18 may be placed in a broadleaf stem holder 30 until used for assembly. Broadleaf stem holders 30 and 48 are intended not only to be used to store and/or transport stacked broadleaf stems 18, but also to hold them in the correct configuration and shape for later assembly into leaf display devices.

Figure 13:
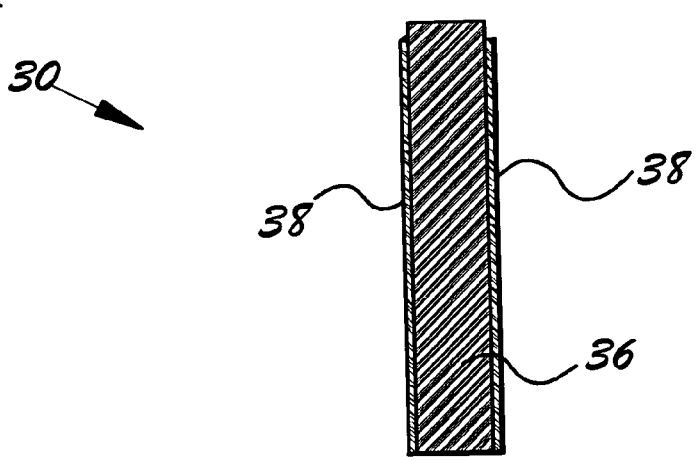
FIG. 13 is a cross-sectional view of a broadleaf stem holder taken at section XII-XII of FIG. 12.

FIG. 12 is a front isometric view of broadleaf stem holder 30. FIG. 13 is a cross-sectional view of broadleaf stem holder 30 taken at section XII-XII of FIG. 12. Broadleaf stem holder 30 is made up of core 36, and may further comprise one or more outer re-enforcements 38. Core 36 is made of soft material such as foam rubber, so as to not damage stacked broadleaf stems 18. Outer re-enforcements 38 are made of stronger, more rigid material, in order to strengthen core 36. In the preferred embodiment, outer re-enforcements 38 were made of hard plastic.

Broadleaf stem holder 30 comprises notches 32 in core 36 sized to admit stacked broadleaf stems 18. Corresponding notches are cut into outer re-enforcement(s) 38 of larger size than core notches 32, so that the only material in direct contact with stacked broadleaf stems 18 being stored in broadleaf stem holder 30 is the soft material of core 36. It was determined experimentally that the optimum notch angle 34 between the walls of notch 32 was 12 degrees±10 degrees.

Figure 14:
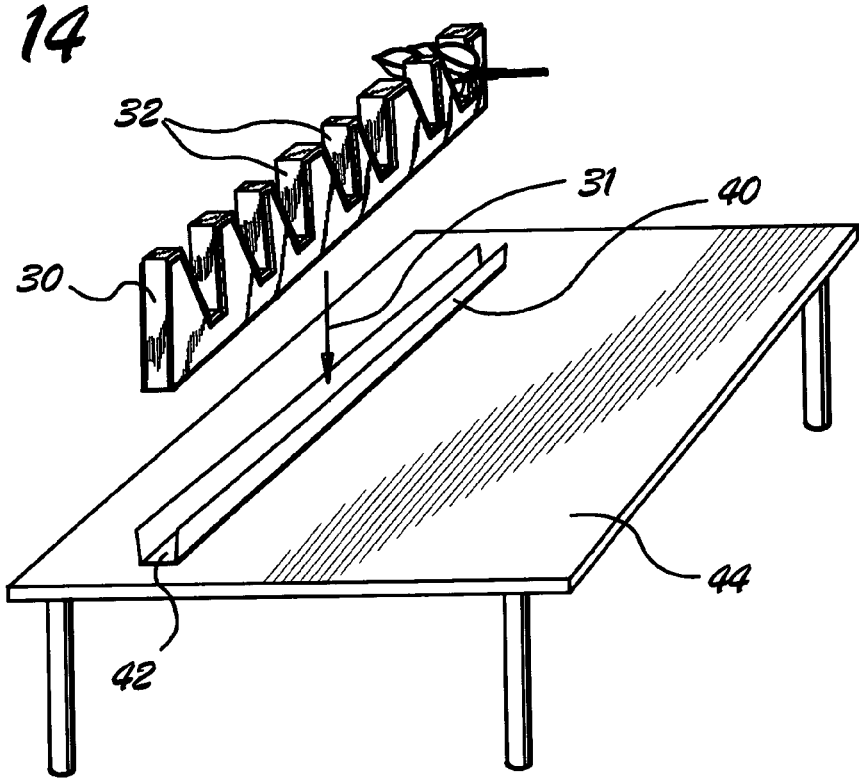
FIG. 14 is a front isometric view of a broadleaf stem holder ready to be inserted into a broadleaf stem holder support mounted to a table.

FIG. 14 is a front isometric view of broadleaf stem holder 30 ready to be inserted into a broadleaf stem holder support 40 mounted to table 44 as indicated by arrow 31. As may be noted in FIG. 14, broadleaf stem holder support 40 comprises groove 42 sized to admit broadleaf stem holder 30. A worker sitting at table 44 may produce stacked broadleaf stems 18, inserting each one in a notch 32 when each is finished.

Figure 15:
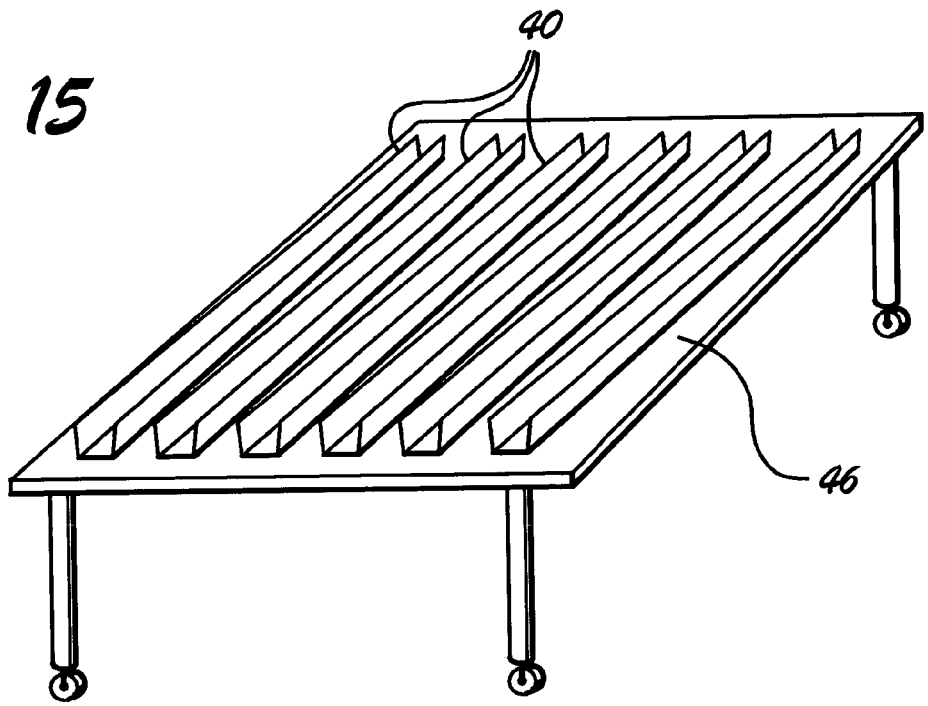
FIG. 15 is a front isometric view of a number of broadleaf stem holder supports mounted to a transportation device.

A broadleaf stem holder 30 may be placed on a transportation device and transported to another location for assembly into a leaf display device. FIG. 15 depicts one example of a transportation device, which is cart 46. Broadleaf stem holder 30 may be transferred to a broadleaf stem holder support 40 mounted to cart 46. When a desired number of broadleaf stems holders 30 have been loaded onto cart 46, cart 46 may be wheeled over to a final assembly area, where the stacked broadleaf stems 18 thus stored and transported may be assembled into leaf display forms such as are illustrated in FIGS. 2 and 3.

This production method has been found to increase efficiency, because one station assembles stacked broadleaf stems 18, while a different station assembles the completed stacked broadleaf stems 18 into leaf display devices such as wreaths, garlands, or other finished products. While the transportation device depicted in FIG. 15 is a wheeled cart, it is intended to fall within the scope of this invention that any appropriate transportation device be employed, including but not limited to conveyers, overhead cable systems, etc. While the cart 46 depicted in FIG. 15 contains a single shelf, it is contemplated that carts or other transportation devices incorporating any number of shelves fall within the scope of this disclosure.

FIG. 16 is a front isometric view of an alternate embodiment broadleaf stem holder 48. Alternate embodiment broadleaf stem holder 48 comprises recess 50 sized to admit stacked broadleaf stems 18 as indicated by arrow 56. Recess 50 is sized to admit stacked broadleaf stems 18, and its height is sufficiently low so as to maintain stacked broadleaf stems 18 in their finished configuration when they are inserted into recess 50.

Figure 17:
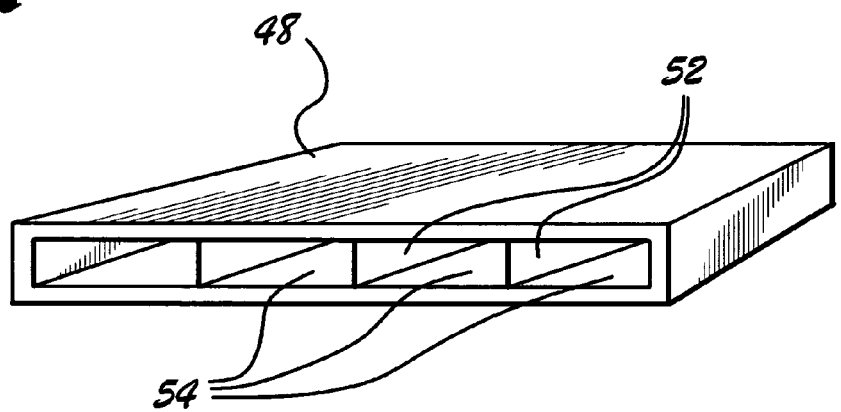
FIG. 17 is a front isometric view of an alternate embodiment broadleaf stem holder incorporating partitions.

FIG. 17 is a front isometric view of an alternate embodiment broadleaf stem holder 48 incorporating partitions 52 defining individual recesses 54. Individual recesses 54 are sized to admit one or more stacked broadleaf stems 18, and their height is sufficiently low so as to maintain stacked broadleaf stems 18 in their finished configuration when they are inserted into individual recesses 54.

After stacked broadleaf stems 18 have been assembled into finished products, it may be desirable to dry the finished product for preservation purposes. It has been determined experimentally that drying finished leaf display device products such as wreaths or garlands face down for three days in 30% 10% humidity, at a temperature of 85-90±5 degrees F., followed by one day face up under the same conditions, produces the best results. Leaving the wreaths or garlands face down dries the individual leaves more parallel to the surface of the wreath or garland, and improves the appearance of same. If hotter temperatures are used (such as 95+ degrees F.) undesirable browning may occur.

An alternate method of drying is to leave the wreaths or garlands face up, with a sheet of stiff cardboard covering them, and a weight of approximately 1±5 pounds per product on the stiff cardboard sheet. This procedure also dries the individual leaves more parallel to the surface of the wreath or garland, and improves the appearance of same.

While a preferred embodiment of the invention has been illustrated herein, it is to be understood that changes and variations may be made by those skilled in the art without departing from the spirit of the appending claims.

DRAWING ITEM INDEX 2 broadleaf stem
4 broadleaf stem top portion
6 first leaf
7 stem
8 second leaf
10 third leaf
12 fourth leaf
14 fifth leaf
16 bottom leaf
18 stacked broadleaf stem
20 stem bottom
22 stacked broadleaf stem width
24 leaf width
30 broadleaf stem holder
31 arrow
32 notch
34 notch angle
36 core
38 outer re-enforcement
40 broadleaf stem holder support
42 groove
44 table
46 cart
48 alternate embodiment broadleaf stem holder support
50 recess
52 partition
54 individual recess
56 arrow
104 clamp
106 ring frame
108 garland frame

We claim:

1. A method of manufacturing a leaf display device using an apparatus comprising a broadleaf stem holder, said broadleaf stem holder comprising a recess sized to admit at least one stacked broadleaf stem, said method comprising the steps of:
  A. Positioning a top leaf on a broadleaf stem substantially co-linear with said broadleaf stem;
  B. Positioning a leaf adjacent said top leaf substantially parallel to, and partially on top of said top leaf;
  C. Positioning a leaf adjacent the leaves already stacked substantially parallel to, and partially on top of the previously stacked leaves;
  D. Repeating the previous step until all leaves desired to be stacked have been stacked; and
  E. Placing one said stacked broadleaf stem into said recess, whereby said stacked broadleaf stem is held in the stacked configuration, ready for later assembly into a leaf display device.

2. The method of manufacturing a leaf display device of claim 1 comprising the further step of removing said stacked broadleaf stem from said broadleaf stem holder and attaching said stacked broadleaf stem to a leaf display device frame.

3. The method of manufacturing a leaf display device of claim 2 comprising the further step of placing at least one said broadleaf stem holder on a transportation device, transporting said at least one broadleaf stem holder to a leaf display device assembly location, and attaching at least one said stacked broadleaf stem to a leaf display device frame.

4. A method of manufacturing a leaf display device comprising the steps of:
  A. Positioning a top leaf on a broadleaf stem substantially co-linear with said broadleaf stem;
  B. Positioning a leaf adjacent said top leaf substantially parallel to, and partially on top of said top leaf;
  C. Positioning a leaf adjacent the leaves already stacked substantially parallel to, and partially on top of the previously stacked leaves;
  D. Repeating the previous step until all leaves desired to be stacked have been stacked;
  E. Placing a leaf display device inverted in a drying area, drying for three days at a temperature substantially equal to 85-90 degrees F.±5 degrees and a relative humidity equal to 30%+10%, and then turning the leaf display device right side up for an additional day of drying under the same conditions.

* * * * *